United States Patent [19]

White et al.

[11] Patent Number: 5,395,692
[45] Date of Patent: Mar. 7, 1995

[54] PHOTODEGRADABLE POLYESTERS

[75] Inventors: Alan W. White; Joseph R. Zoeller, both of Kingsport, Tenn.

[73] Assignee: Eastman Chemical Company, Kingsport, Tenn.

[21] Appl. No.: 239,639

[22] Filed: May 6, 1994

[51] Int. Cl.$^6$ ...................... D02G 3/00; C08G 14/00
[52] U.S. Cl. ................... 428/364; 528/220;
528/226; 528/272; 528/293; 528/298; 528/300;
528/301; 528/302; 528/303; 528/306; 528/307;
528/308; 528/308.6; 260/DIG. 43
[58] Field of Search ............. 528/220, 226, 272, 293,
528/298, 300, 301, 302, 303, 306, 307, 308,
308.6, 125; 260/DIG. 43; 428/364

[56] References Cited

U.S. PATENT DOCUMENTS 3,878,169  4/1975  Guillet et al. .................. 528/220
4,965,399 10/1990  Zoeller et al. ................... 560/64
5,025,086  6/1991  Blount, Jr. et al. .............. 528/272

OTHER PUBLICATIONS

R. Conrad and M. A. Dolliver, *Org. Syn., Coll.* vol. II, 167 (1943).
G. M. Harlan and A. Nicholas, *Proceedings of Symposium on Degradable Plastics, The Society of the Plastic Industry, Inc.,* Washington, D.C., Jun. 10, 1987, p. 14.
J. E. Potts, *Plastics, Environmentally Degradable,* for the *Encylopedia of Chemical Technology,* John Wiley & Sons, Section C-5, Oct. 13, 1982.

*Primary Examiner*—Samuel A. Acquah
*Attorney, Agent, or Firm*—Betty J. Boshears; Harry J. Gwinnell

[57] ABSTRACT

This invention relates to a polyester comprising repeating units having the structure:

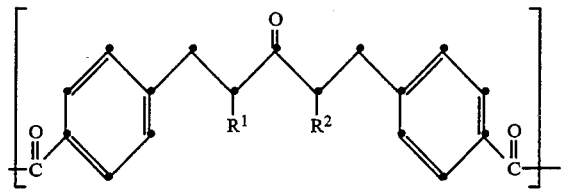

wherein $R^1$ is selected from the group consisting of hydrogen, alkyl having 1 to 6 carbon atoms and aryl having 6 to 10 carbon atoms and $R^2$ is selected from the group consisting of hydrogen, alkyl having 1 to 6 carbon atoms, and aryl having 6 to 10 carbon atoms.

14 Claims, No Drawings

PHOTODEGRADABLE POLYESTERS

FIELD OF THE INVENTION

This invention relates to the ketone, 1,5-bis-(4'-alkoxycarbonylphenyl)-3-pentanone, which renders polyesters photodegradable when it is included to form a copolymer.

BACKGROUND OF THE INVENTION

Polyesters, particularly those used for food and beverage packaging, have some very desirable features, such as safety and low cost of transportation. However, when these containers are not recycled or are improperly discarded, they represent an aesthetic blight on the landscape. Therefore, it would be very desirable to develop a polyester that retains the useful properties of these polyester packages but would dissipate spontaneously in the environment when discarded improperly.

One approach to this problem would be to take advantage of the degradative effect of the strong ultraviolet radiation emitted naturally by the sun. It is already known in the art that the introduction of some ketone-containing moieties into a polyester chain gives an ultraviolet sensitivity to polyesters, causing them to become brittle in the process. The brittleness causes the polyesters to crumble and ultimately dissipate.

Reportedly, the degradation requires shorter wavelength ultraviolet radiation, generally in the range of 280-320 nanometers. These wavelengths are generally filtered out of the spectrum by ordinary glass. Therefore, since the requisite ultraviolet wavelengths are not present in indoor environments, the rate of degradation indoors would be very slow.

We have discovered ketones which introduce ultraviolet sensitivity to a polyester.

U.S. Pat. No. 4,965,399 discloses 1,5-bis(substituted-aryl)-3-pentanols which are useful in the preparation of polymeric materials.

U.S. Pat. No. 5,025,086 discloses 1,5-bis(4-carboxycyclohexyl)-3-pentanol and its esters and processes for their preparation.

U.S. Pat. No. 3,878,169 discloses polyesters which contain ketone groups in the side chains, but not in the backbone of the polyester.

It has heretofore been unknown to use ketones such as those used in this invention as a repeating unit in the structure of a polyester.

SUMMARY OF THE INVENTION

This invention relates to a polyester comprising repeating units of:

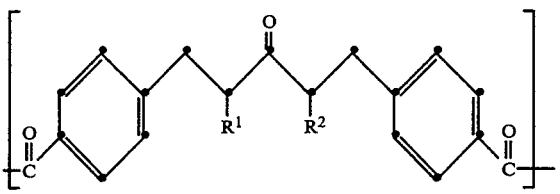

wherein $R^1$ is selected from the group consisting of hydrogen, alkyl having 1 to 6 carbon atoms and aryl having 6 to 10 carbon atoms and $R^2$ is selected from the group consisting of hydrogen, alkyl having 1 to 6 carbon atoms and aryl having 6 to 10 carbon atoms.

This ketone introduces ultraviolet sensitivity to a polyester which the polyester previously did not possess at the same level.

An additional advantage of this ketone is, since the levels required to impart the desirable photosensitivity are relatively low, the introduction of this material should not significantly effect the normal processing of these polymers. The ketone has the added advantage of being derived from methyl 4-formyl benzoate, an inexpensive and readily available by-product of dimethyl terephthalate production which must otherwise be recycled or disposed in an environmentally sound fashion.

DETAILED DESCRIPTION OF THE PREFERRED EMBODIMENTS

This invention relates to substituted 3-pentanones, such as 1,5-bis-(4,'-alkoxycarbonylphenyl)-3-pentanone. The ketone, 1,5-bis-(4,-methoxycarbonylphenyl)-3-pentanone, is a more specific example of this type of ketone.

Specifically, this invention relates to a polyester comprising repeating units of:

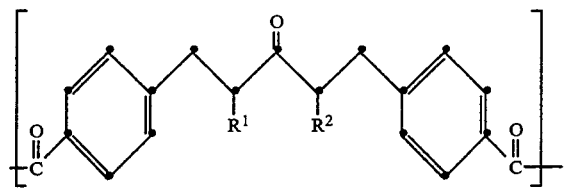

wherein $R^1$ is selected from the group consisting of hydrogen, alkyl having 1 to 6 carbon atoms and aryl having 6 to 10 carbon atoms and $R^2$ is selected from the group consisting of hydrogen, alkyl having 1 to 6 carbon atoms and aryl having 6 to 10 carbon atoms.

For the purposes of this invention, examples of alkyl having 1 to 6 carbon atoms are methyl, ethyl, propyl, butyl, pentyl, isobutyl, isopropyl and hexyl. Examples of aryl having 6 to 10 carbon atoms are phenyl, naphthyl and xylyl. It is preferred that $R^1$ and $R^2$ both are either hydrogen, methyl or phenyl. It is more preferred that $R^1$ and $R^2$ are hydrogen.

It is preferred that the repeating unit which is a ketone is present in the polyester in an amount of 0.1-100 mole percent, preferably 0.1-15 mole percent, and more preferably 1.0-5 mole percent of the repeating units derived from diacids and diesters.

As an example of the process for making the substituted 3-pentanones, a specific example is provided hereafter:

1,5-bis-(4'-methoxycarbonylphenyl)-3-pentanone is synthesized in the following manner:

Methyl 4-formyl benzoate was condensed with acetone to generate 1,5-bis-(4'-methoxycarbonylphenyl)-1,4-pentadien-3-one and subsequently hydrogenated over an hydrogenation catalyst. The following schematic represents these reactions:

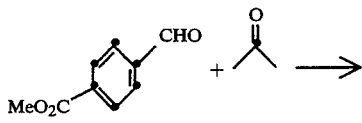

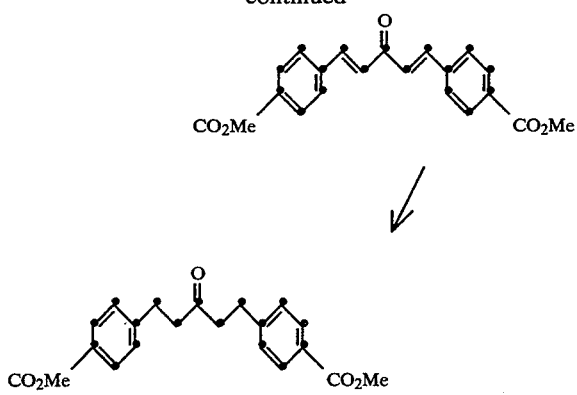

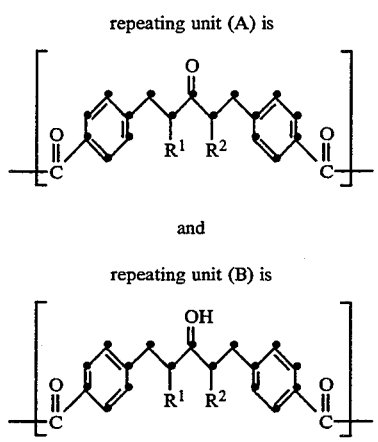

The biscondensation of benzaldehydes with ketones, particularly acetone, is a well known process as disclosed by R. Conrad and M. A. Dolliver, Org. Syn., Coll. Vol. II, 167 (1943). The condensation shown is base catalyzed.

The invention also relates to a process for the preparation of a polyester comprising repeating unit (A) and comprising less than 0.5 mole % repeating unit (B) based on the total number of moles of diacids or diesters, wherein repeating unit (A) is (A)

and repeating unit (B) is (B)

wherein $R^1$ is selected from the group consisting of hydrogen, alkyl having 1 to 6 carbon atoms or aryl having 6 to 10 carbon atoms and $R^2$ is selected from the group consisting of hydrogen, alkyl having 1 to 6 carbon atoms, or aryl having 6 to 10 carbon atoms which comprises the steps of:

(1) reacting a 4-substituted-benzaldehyde(s) having the formula:

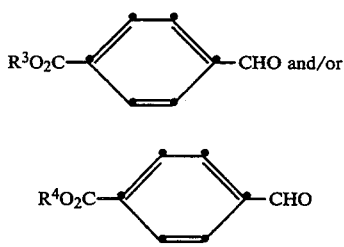

with a ketone having the formula:

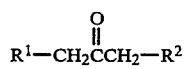

in the presence of an acidic or basic condensation catalyst to obtain an intermediate compound having the formula:

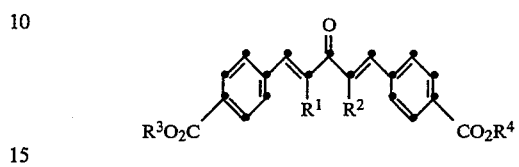

(2) hydrogenating the intermediate compound in the presence of a catalytic amount of a hydrogenation catalyst selected from mixed copper-chromium oxides and supported Group VIII nobel metals under hydrogenation conditions of pressure and temperature; wherein the structure

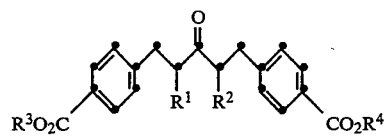

$R^1$ is selected from the group consisting of hydrogen, alkyl having 1 to 6 carbon atoms and aryl having 6 to 10 carbon atoms and $R^2$ is selected from the group consisting of hydrogen, alkyl having 1 to 6 carbon atoms, and aryl having 6 to 10 carbon atoms, and $R^3$ and $R^4$ are selected from the group consisting of hydrogen and alkyl having 1 to 6 carbon atoms. $R^3$ and $R^4$ are preferably alkyl having 1 to 2 carbons;

(3) polymerization of the diester with other diesters or diacids and diol or diols at temperatures of 200°–300° C. and pressures of 1000 mm to 0.01 mm.

The first step of the above-described process is carried out by reacting approximately 2 moles of the aldehyde per mole of ketone in the presence of an acidic or basic catalyst.

Examples of materials which may be used as the catalyst include the alkali metal hydroxides, alkoxides and carbonates; the alkaline earth hydroxides and oxides; quaternary ammonium hydroxides such as tetraunsubstituted or substituted alkylammonium hydroxides wherein the four alkyl residues contain a total of up to about 20 carbon atoms; alkyl- and aryl-sulfonic acids; acidic ion exchange resins such as Amberlyst 15; and mineral acids such as sulfuric and hydrochloric acid.

The condensation reaction normally is conducted in the presence of an inert solvent such as aliphatic and aromatic hydrocarbons, e.g., having from about 6 to 12 carbon atoms and alkanols, .e.g., having up to about 6 carbon atoms.

Methanol is the preferred solvent since it is compatible with methyl esters and generally dissolves all of the reaction components. The temperature of the condensation step can be varied substantially depending on a number of factors such as the reactants and catalyst being used, catalyst concentration, etc. Although temperatures as low as −25° C. and as high as 250° C. may be used under some circumstances, the condensation reaction normally will be performed at a temperature in the range of about 0° to 140° C., preferably 0° to 50° C.

Pressure is not normally important for the condensation and, while pressure moderately above or below atmospheric may be used, the first step most conveniently is done at ambient pressure.

Examples of the Group VIII noble metals which may be used to catalyze the hydrogenation, the second step, include palladium and platinum. A particularly preferred catalyst is palladium. Examples of the materials on which the Group VIII noble metals may be supported include silica, alumina, alumina silica, carbon, titania, etc.

The concentration of the Group VIII metal catalyst can vary substantially depending on a number of factors such as the activity and/or selectivity of the particular catalyst, the surface area of the catalyst, the hydrogenation conditions, the mode of operation, etc. For example, when using a tricklebed hydrogenation system wherein a solution of a 1,5-bis(4'-substituted aryl)penta-1,4-dien-3-one flows over and through one or more fixed beds of the catalyst in granular form in a hydrogen atmosphere at elevated temperature and pressure, the concentration of the catalyst relative to the reactant cannot be determined with any degree of accuracy.

The hydrogenation conditions of temperature and pressure may vary over a wide range depending, for example, on the factors referred to above concerning catalyst concentration. Furthermore, to some extent, temperature and pressure are interdependent and, thus, increasing one may permit lowering of the other. Generally, the hydrogenation conditions will be within the ranges of about 20° to 300° C. and about 10 to 500 psig hydrogen. The preferred ranges are about 20° to 200° C. and about 15 to 250 psig hydrogen. Typically, the hydrogenation is carried out in the presence of an inert organic solvent for the 1,5-bis(4'-substituted-aryl) penta-1,4-dien-3-one.

Examples of solvents which may be used include hydrocarbons such as aliphatic, cycloaliphatic and aromatic hydrocarbons containing about 6 to 12 carbon atoms, e.g., benzene, toluene, xylene, cumene, psuedocumene, diisopropylbenzene, cyclohexane, hexane, heptane, etc.; carboxylic acid esters such as alkyl carboxylates containing up to about 6 carbon atoms, e.g., methyl acetate, ethyl acetate, methyl butyrate, etc; alkanols containing up to about 6 carbon atoms, e.g., methanol, ethanol, 2-propanol, etc. The concentration of the pentadienone reactant in the solvent is not important and is limited only by the solubility of the particular reactant in the solvent being used and economic considerations. For most reactants the preferred inert organic solvents are toluene, xylene, 2-propanol and methanol.

It is generally accepted that olefin hydrogenation is a simple process in most instances. We have found, however, that the hydrogenation of 1,5-bis-(4'-alkoxycarbonylphenyl)-1,4-pentadien-3-one to 1,5-bis(4'-alkoxycarbonylphenyl)-3-pentanone was less than trivial. Often, 1,5-bis-(4'-alkoxycarbonylphenyl)-3-pentanol is obtained as a by-product. The loss of selectivity upon attempting to hydrogenate unsaturated ketones has been previously observed but has serious consequences in this invention.

Whereas 1,5-bis-(4'-carbomethoxyphenyl)-3-pentanone and 1,5-bis-(4'-carbomethoxyphenyl)-3-pentanol are separable by several acceptable laboratory techniques, such as chromatography, methods more amenable to industrial level preparations, particularly crystallization, result in substantial losses of the desired ketone.

Typically, 1,5-bis-(4'-alkoxycarbonylphenyl)-3pentanone and 1,5-bis-(4'-alkoxycarbonylphenyl)-3-pentanol co-crystalize in a ratio of approximately 3:1 when significant amounts of 1,5-bis-(4'-alkoxycarbonylphenyl)-3-pentanol are present.

Further complicating the process is the observation that even small quantities of 1,5-bis-(4'-alkoxy-carbonylphenyl)-3-pentanol have serious consequences in the subsequent polymerization. Since 1,5-bis-(4'-alkoxycarbonylphenyl)-3-pentanol is trifunctional with respect to polyester formation, it acts to branch and crosslink polyesters resulting in unacceptable product properties when present in greater than about 0.5 mole % based on the total number of moles of diacid or diester.

Unless substantial yield losses and a difficult operation are to be tolerated, this requires one of two approaches to attaining the pure 1,5-bis-(4'-alkoxycarbonylphenyl)-3-pentanone required from this process. Either the hydrogenation of 1,5-bis-(4'-alkoxycarbonylphenyl)-1,4-pentadien-3-one to 1,5-bis(4'-alkoxycarbonylphenyl)-3-pentanone must proceed with very high selectivity, which represents the preferred process, or the by-product 1,5-bis-(4'-alkoxycarbonyl)3-pentanol must be reoxidized to 1,5-bis-(4'-alkoxycarbonylphenyl)-3-pentanone. We have demonstrated that either approach is viable.

The key to making the preferred approach operate is the judicious choice of catalyst. This is much more difficult than it would appear. Although it would be anticipated that almost all hydrogenation catalysts would yield the desired 1,5-bis-(4'-alkoxycarbonylphenyl)-3-pentanone, identifying catalysts with the appropriate high selectivity to the desired product required extensive effort. We have found at least two catalyst combinations that may be effective for the desired transformation in nearly 100% selectivity. These were 5% palladium on carbon operated at slightly elevated temperatures and atmospheric pressure and a quinoline-poisoned 0.5% platinum on alumina which operated at elevated temperature and pressure.

A large variety of solvents are useful as the reaction medium, although the most preferred would be lower molecular weight alcohols, esters, ketones, carboxylic acids, or aromatic hydrocarbons since the starting materials are soluble to some appreciable degree in these solvents, particularly at elevated temperatures.

Specifying a temperature and pressure for this part of the process would prove difficult since it would be very dependent upon the choice of catalyst and solvent. For example, a poisoned platinum catalyst operated at 175° C. and 250 psig in toluene might operate similar to a palladium catalyst on carbon operated at 50° C. and 15–30 psi.

However, successful processes, defined as having a high selectivity to the desired 1,5-bis-(4'-alkoxy-carbonylphenyl)-3-pentanone, would be expected to generally proceed at lower temperatures and pressures than the processes which give substantial amounts of undesired alcohol.

Processes in which 1,5-bis-(4'-alkoxycarbonylphenyl)-3-pentanol is obtained as a co-product may also be used with an added oxidation protocol, although it is obviously not the preferred approach since it adds a step to the overall process. Methods of oxidizing alcohols are numerous, well known to any practitioner of the art, and can be found in any good text on organic chemistry. Suitable reagents include sodium hypochlorite in acetic acid and chromic acid in aqueous sulfuric acid.

To exemplify this reoxidation approach, we utilized an Oppenhauer oxidation which entailed treating a mixture of 1,5-bis-(4'-methoxycarbonylphenyl)-3-pentanol and 1,5-bis-(4'-methoxycarbonylphenyl)-3-pentanone with cyclohexanone in the presence of a catalytic quantity of aluminum isopropoxide in refluxing toluene.

This treatment converted a mixture of ca. 1:1 1,5-bis-(4'-methoxycarbonylphenyl)-3-pentanol to 1,5-bis(4'-methoxycarbonylphenyl)-3-pentanone to a mixture which was well in excess of 90% the desired 1,5-bis-(4'-methoxycarbonyl)-3-pentanone.

The copolymerization of 1,5-bis-(4'-methoxy-carbonylphenyl)-3-Pentanone occurs using conditions which are similar to those used in commercial production of polyesters. Initially, 1,5-bis-(methoxycarbonylphenyl)-3-pentanone is included in minor amounts (<5 mol % based on the total amount of diesters) in a copolymerization reaction with an acid and glycol under relatively mild conditions. These reaction conditions give a polymer that has properties similar to those of unmodified poly(ethylene terephthalate) which has been prepared under the same conditions.

The glycol useful in the invention comprises a diol selected from the group consisting of ethylene glycol; 1,2-propanediol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3propanediol; 1,3-butanediol; 1,4-butanediol; 1,5-pentanediol, 1,6-hexanediol, 2,2,4-trimethyl-1,3-pentanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol; diethylene glycol, triethylene glycol; tetraethylene glycol; and pentaethylene, hexaethylene, heptaethylene, octaethylene, nonaethylene, and decaethylene glycols or combinations thereof.

The polyester of the invention further comprises a dicarboxylic acid residue selected from the group consisting of oxalic; malonic; dimethylmalonic; succinic; glutaric; adipic; trimethyladipic; pimelic; 2,2-dimethylglutaric; azelaic; sebacic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic; terephthalic; isophthalic; 2,5-norbornanedicarboxylic; 1,4-naphthalic; diphenic; 4,4'-oxydibenzoic; diglycolic; thiodipropionic; 4,4'-sulfonyldibenzoic; 4,4'-biphenyldicarboxylic; and 2,6-naphthalenedicarboxylic acids or esters thereof and combinations thereof.

The polyesters of the invention are useful in preparing sheets, films, fibers and molded objects.

It was later discovered that harsher conditions (higher temperatures and other catalyst systems) also produced high quality copolymers in even higher molecular weight (Inherent viscosity=0.60). The 1,5-bis-(4'-methoxycarbonylphenyl)-3-pentanone was later successfully copolymerized at much higher levels than 5%. The success of these reactions is generally dependent on the purity of the 1,5-bis-(4'-methoxycarbonylphenyl)-3-pentanone. When material of high purity is used, an essentially linear polyester is produced. The presence of 1,5-bis-(4'-methoxycarbonyl phenyl)-3-pentanone in the copolyesters had no detrimental effect on solid stating. Therefore, the molecular weights of the copolyesters can, if desired, be increased beyond what is possible in the melt phase.

The 1,5-bis-(4'-methoxycarbonylphenyl)-3-pentanone was copolymerized with monomers in addition to dimethyl terephthalate and ethylene glycol, such as 1,4-bis(hydroxymethyl) cyclohexane and diethylene glycol.

The photodegradation of copolyesters prepared from 1,5-bis-(4'-methoxycarbonylphenyl)-3-pentanone will be discussed as follows:

Polyethylene has been made photodegradable by incorporation of ketone carbonyl groups into the polymer backbone at low levels (0.1-5%) as disclosed by G. M. Harlan and A. Nicholas, Proceedings of Symposium on Degradable Plastics, The Society of the Plastics Industry, Inc., Washington, D.C., Jun. 10, 1987, p. 14, and by J. E. Potts, "Plastics, Environmentally Degradable," for the *Encyclopedia of Chemical Technology*, John Wiley and Sons, Section C-5, Oct. 13, 1982.

Commercial processes for the production of ethylene-carbon monoxide (ECO) copolymer are in place. This material is commercially available. These photodegradable materials are being used already in applications where photodegradability is desired, such as 6-ring binders and garbage bags. These polymers are photodegradable because the ultraviolet radiation in sunlight causes cleavage of the polymer chains near the ketone groups.

In this invention, copolyesters prepared from low levels (0.5-10 mol %) of 1,5-bis-(4'-methoxycarbonylphenyl)-3-pentanone are shown to be photodegradable also. Upon exposure to ultraviolet radiation, the copolyesters prepared from 1,5-bis-(4'-methoxycarbonylphenyl)-3-pentanone did not lose their structural integrity as fast as similar ECO copolymers did. Amorphous films prepared from these copolyesters did photodegrade (lose their structural integrity) both in a Weather-Ometer (AATCC-16-E) and in sunlight. The conditions in the Weather-Ometer (AATCC-16-E) were as follows: Xenon arc lamp, 63° C. and 30% relative humidity. The films were mounted so that the light shone directly on one side of the film as it orbited around the light. The degradation was evidenced by the brittleness observed when the irradiated films were creased and by the large increases in the molecular weight distribution (quotient of the Z-average molecular weight and the number-average molecular weight). The molecular weight distribution for unmodified poly(ethylene)-terephthalate does not increase upon irradiation for 400 hours in the Weather-Ometer. About three months (February through April) of exposure to sunlight in Tennessee was equivalent to approximately 400 hours exposure in a xenon arc Weather-Ometer at 63° C. and 30% relative humidity.

Later experiments were conducted on oriented films. The polyesters of this invention can be oriented in one or both directions by stretching films at temperatures above the glass transition temperature of the polyester. Optimum orientation temperatures are 10° to 40° C. above the glass transition temperatures. These oriented films also degraded when exposed to ultraviolet radiation, as evidenced by decreases in elongation and tensile strength. This is important since many articles prepared from polyesters are oriented during the fabrication process.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise noted. All percentages are by weight unless otherwise indicated.

Abbreviations mL=milliliter; L=liter; g=gram; hr=hour; s=singlet; d=doublet; Hz=hertz; MHz=megahertz; HNMR=Nuclear Magnetic Resonance Spectroscopy for hydrogen; IR=infrared spectroscopy; psi—pounds per square inch; mm=millimeters; ppm=parts per million; mPa=megapascal.

EXAMPLES

Example 1

Condensation of Methyl 4-Formyl Benzoate With Acetone

This procedure describes a typical base catalyzed condensation of methyl 4-formyl benzoate with acetone and is the procedure generally used.

A solution of 0.55 moles (90.3 g) of methyl 4-formyl benzoate was prepared under an inert atmosphere using a mechanical stirrer. (The inert atmosphere is maintained throughout the reaction to minimize oxidation of the methyl 4-formyl benzoate.) To this solution was added 0.25 (14.5 g, 18.3 mL) moles of acetone. A cooling bath, consisting simply of an evaporating dish filled with cold tap water, was placed under the reaction vessel and a solution of 2.5 g (0.0625 moles) of NaOH in 25 mL of 1:1 methanol/water was added slowly using an addition funnel. The rate of addition is determined by the temperature of the reaction which is maintained at less than 35° C.

When the reaction began, the solution initially turned yellow and then a light yellow precipitate formed which eventually became a thick slurry.

After 2.5 hrs. the reaction mixture was filtered and washed with methanol until the wash solution is no longer dark. The product was allowed to air dry on the filter to yield 82.9 g (95% yield) of 1,5-bis-(4'-methoxycarbonylphenyl)-1,4-pentadien-3-one.

The product could be readily recrystallized from acetic acid or xylene. HNMR (CDCl$_3$) 270 MHz $\delta$=3.93 (s,6H), 7.15(d,2H, J=16 Hz), 7.68 (d,4H, J=10 Hz), 7.76 (d,2H, J=16 Hz), 8.09 (d,4H, J=10Hz). IR (KBr): 1720, 1653, 1284 cm$^{-1}$. Elemental Analysis: Calc. for C$_{21}$H$_{12}$O$_5$: C,71.99; H,5.18. Found: C,71.98; H,5.15. m.p. 221°-223° C.

Example 2

Synthesis of 1,5-Bis-(4'-Methoxycarbonylphenyl)-3-Pentanone

A heterogeneous mixture of 71.7 g of 1,5-bis-(4'-methoxycarbonyl-phenyl)-1,4-pentadien-3-one, 3.8 grams of 5% Pd on carbon, and 650 mL of 2-propanol was prepared in a 1 L 3-necked flask. The mixture was stirred mechanically and heated to 50° C. The system was flushed with hydrogen, and hydrogen was then supplied on a continuous basis at about 20 psi. The hydrogen uptake was initially very rapid, but gradually slowed. When hydrogen uptake nearly ceased, the hydrogen source was removed. The vessel was heated to 75°-80° C. and purged thoroughly with nitrogen. The hot product was filtered through a steam-jacketed Buchner funnel which contained a pad of filter-aid. The hot filtrate immediately began to precipitate the product.

The filtrate was allowed to cool to room temperature and was then placed in a freezer at −15° C. to complete the precipitation of the product. The product was filtered and dried to yield 58.21 grams (80% yield) of 1,5-bis-(methoxycarbonylphenyl)-3-pentanone. Reduction in the volume to ca. 200 mL and cooling yielded an additional 1.59 grams of product giving a total yield of 82%. HNMR (CDCl$_3$) 270 MHz $\delta$=2.72 (t,4H), 2.93 (t,4H), 3.91 (s,6H), 7.21 (d,4H), 7.94 (d,2H). FDMS (M+/e): 3.54. Elemental Analysis: Calc. for C$_{21}$H$_{16}$O$_5$: C,71.17; H,6.26. Found: C,71.27; H,6.33. m.p. 105°-108° C.

Example 3

This example demonstrates that another catalyst is useful. A heterogeneous mixture of 10.0 g of 1,5-bis(4'-methoxycarbonylphenyl)-1,4-pentadien-3-one, 1.0 gram of 0.5% Pt on alumina catalyst, 0.2 mL of quinoline, and 100 mL of toluene was prepared in an hydrogenation autoclave. The autoclave was pressurized to 25 psi with hydrogen and then heated to 175° C. Upon reaching the desired temperature, the pressure was adjusted to 250 psi with hydrogen. These conditions were maintained for 5 hours, and the reaction was allowed to cool to room temperature. The product was filtered, and the solid product was determined to be pure 1,5-bis-(4'-methoxycarbonylphenyl)-3-pentanone by gas chromatographic analysis.

Example 4

This example demonstrates a case in which the desired 1,5-bis-(methoxycarbonylphenyl)-3-pentanone is obtained as a mixture with the undesired, overhydrogenation product, 1,5-bis-(4'-methoxycarbonylphenyl)-3-pentanol. A heterogeneous mixture of 10.0 g of 1,5-bis(4'-methoxycarbonylphenyl)-1,4-pentadien-3-one, 1.0 grams of 5% rhodium on carbon catalyst, and 100 mL cyclohexane was prepared in an hydrogenation autoclave. The autoclave was pressurized to 25 psi with hydrogen and then heated to 175° C. Upon reaching the desired temperature the pressure was adjusted to 250 psi with hydrogen. These conditions were maintained for 5 hrs, and the reaction was allowed to cool to room temperature. The product was filtered, and the solid product composition determined to be 75% 1,5-bis-(4'-methoxycarbonylphenyl)-3-pentanone and 19% 1,5-bis-(4'-methoxycarbonylphenyl)-3-pentanol by gas chromatographic analysis.

Example 5

This example demonstrates one example of an oxidative protocol for converting mixtures of the desired 1,5-bis-(4'-methoxycarbonylphenyl)-3-pentanone and undesired, overhydrogenation product, 1,5-bis-(methoxycarbonylphenyl)-3-pentanol, which are often obtained in the hydrogenation, to mixtures enriched in the desired 1,5-bis-(methoxy-carbonylphenyl)-3-pentanone. A solution of 2.0 grams aluminum isopropoxide in 100 mL of toluene was prepared and filtered to remove any residual insoluble material. To this solution was added 20 grams of a 1:1 mixture of 1,5-bis-(4'-methoxycarbonylphenyl)-3-pentanone and 1,5-bis-(4'-methoxycarbonylphenyl)-3-pentanol and 25 mL of cyclohexanone. The reaction was heated at reflux overnight. The mixture was analyzed by gas chromatographic analysis and determined to contain 93% 1,5-bis-(methoxycarbonylphenyl)-3-pentanone and 7% 1,5-bis-(methoxycarbonylphenyl)-3-pentanol.

Example 6

Copolymerization of 1,5-bis-(methoxycarbonylphenyl)-3-pentanone, Dimethyl terephthalate and ethylene glycol Dimethyl terephthalate (0.475 mol, 92.2 g), 1,5-bis-(4'-methoxycarbonylphenyl)-3-pentanone (0.025 mol, 8.85 g), ethylene glycol (1.00 mol, 62 g), manganese diacetate (55 ppm of manganese), cobalt diacetate (80 ppm of cobalt), and antimony trioxide (220 ppm of antimony) were combined in a flask and stirred under nitrogen at 200° C. for 1 h, 210° C. for 1.25 h, and 220° C. for 1 h. During this period of time the theoretical amount of methanol distilled from the reaction. The temperature was then increased to 270° C. After 10 min a vacuum was slowly applied. The temperature was maintained at 270° C. for 1.67 h at a vacuum of 0.05 mm of Hg. A light green crystalline polymer resulted. Inherent viscosity=0.60 [0.5 wt % solution in phenol/tetrachloroethane (60:40)]. Nuclear magnetic resonance spectroscopy indicates that the polyester contains 5 mol % of the repeating unit from the ketone-containing monomer. Tg=76.0° C.; Tm=245° C.

Example 7

Solid Stating of Copolyester from Example 1

Particles (approximately 3 mm) of the copolyester described in Example 6 were heated to 207° C. and continuously flushed with nitrogen for 8 hours. The inherent viscosity increased from 0.60 to 0.88, indicating a significant increase in molecular weight. Gel permeation chromatography showed that the copolyester remained essentially linear during this process.

Example 8

Weathering of Amorphous Films of the Copolyesters

Amorphous films (150–200 microns) of the poly(ethylene)terephthalate modified with low levels of 1,5-bis-(4'-methoxycarbonylphenyl)-3-pentanone were prepared and weathered for 400 hours in a xenon arc Weather-Ometer (AATCC-16-E). The table below shows the changes in the quotient of the Z-average molecular weight and the number-average molecular weight as determined by gel permeation chromatography. Quotients higher than approximately 5.0 indicate polyester that is no longer essentially linear.

| Mol % Pentanone | Exposure (h) | Mz/Mn |
| --- | --- | --- |
| 0.0% | 0 | 3.59 |
|  | 400 | 2.88 |
| 2.5% | 0 | 3.37 |
|  | 400 | 11.0 |
| 5.0% | 0 | 3.30 |
|  | 400 | 21.1 |

Example 9

Weathering Oriented Films of the Copolyesters

A copolyester of the same composition as described in Example 7 (Inherent Viscosity=0.88) was extruded into film that was 500 microns thick. This film was oriented (4×4) at 95° C., and the resulting clear film was approximately 40 microns thick. This oriented film was exposed to 400 hours of radiation in a xenon arc Weather-Ometer (AATCC-16-E). During this time period, the elongation was reduced by approximately 40% (84% to 53%) and the tensile strength was reduced by approximately 50% (223 MPa to 121 MPa). The elongation and tensile strength of poly(ethylene)terephthalate is basically unaffected by weathering under these conditions as is the ketone-containing copolyester when placed in the Weather-Ometer and shielded from the radiation.

Example 10

Copolymerization of 1,5-bis-(4'methoxycarbonylphenyl)-3-pentanone, dimethyl terephthalate and ethylene glycol Dimethyl terephthalate (72.8g), 1,5-bis-(4'-methoxycarbonylphenyl)-3-pentanone (44.3g) ethylene glycol (52 g), manganese diacetate (55 ppm manganese), cobalt diacetate (80 ppm cobalt) and antimony trioxide (220 ppm antimony) were combined in a flask and stirred under $N_2$ at 200° C. for 1 h, 210° C. for 1.25 h and 220° C. for 1 h. The temperature was raised to 270° C.–275° C. for 1.67 h and the vacuum was quickly reduced to 0.10 mm of Hg. A light green amorphous polymer resulted. The inherent viscosity was 0.74 as determined at 0.5 wt. % in a 60:40 solution of phenol/tetrachloroethane. Tg=66° C.; $^1$HNMR shows 28 mol % of ketone-containing monomer.

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claim:

1. A polyester comprising repeating units having the structure:

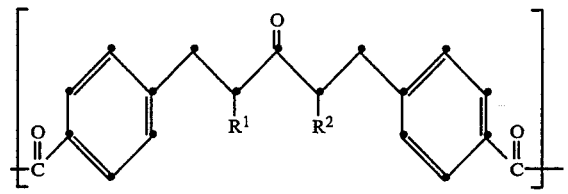

wherein $R^1$ is selected from the group consisting of hydrogen, alkyl having 1 to 6 carbon atoms and aryl having 6 to 10 carbon atoms and $R^2$ is selected from the group consisting of hydrogen, alkyl having 1 to 6 carbon atoms, and aryl having 6 to 10 carbon atoms.

2. The polyester of claim 1 wherein $R^1$ and $R^2$ are both hydrogen.

3. The polyester of claim 1 wherein $R^1$ and $R^2$ are both methyl.

4. The polyester of claim 1 wherein $R^1$ to $R^2$ are both phenyl.

5. The composition of claim 1 wherein said polyester further comprises a repeating unit derived from a diol selected from the group consisting of ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol, 2,2,4-trimethyl-1,3-pentanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p- xylylenediol; diethylene glycol; triethylene glycol; tetraethylene glycol; and pentaethylene; hexaethylene; heptaethylene; octaethylene; nonaethylene; and decaethylene glycols or combinations thereof.

6. The polyester of claim 1 further comprising a structural unit derived from a dicarboxylic acid residue selected from the group consisting of oxalic; malonic; dimethylmalonic; succinic; glutaric; adipic; trimethyladipic; pimelic; 2,2-dimethylglutaric; azelaic; sebacic; fumaric; maleic; itaconic; 1,3-cyclopentane-dicarboxylic; 1,2-cyclohexanedicarboxylic; 1,3-cyclohexanedicarboxylic; 1,4-cyclohexanedicarboxylic; phthalic; terephthalic; isophthalic; 2,5-norbornanedicarboxylic; 1,4-naphthalic; diphenic; 4,4'-oxydibenzoic; diglycolic; thiodipropionic; 4,4'-sulfonyldibenzoic; 4,4'-biphenyldicarboxylic; and 2,6-naphthalenedicarboxylic acids or esters thereof or combinations thereof.

7. The polyester of claim 1 wherein said repeating unit is present in the range of 0.1–100 mole % based on the total mole percentage of repeating units derived from diacids and diesters.

8. The polyester of claim 7 wherein said repeating unit is present in the range of 0.1–15. mole % based on the total mole percentage of repeating units derived from diacids and diesters.

9. The polyester of claim 8 wherein said repeating unit is present in the range of 1–5 mole % based on the total mole percentage of repeating units derived from diacids and diesters.

10. A polyester which is prepared from 1,5-bis-(4'-methoxycarbonyl-phenyl)-3-pentanone, terephthalic acid or its esters, and a glycol component.

11. The polyester of claim 10 wherein the glycol component is ethylene glycol.

12. An oriented film prepared from the polyester of claim 1.

13. A fiber prepared from the polyester of claim 1.

14. A molded object prepared from the polyester of claim 1.

* * * * *